United States Patent [19]

Magic et al.

[11] Patent Number: 5,477,432
[45] Date of Patent: Dec. 19, 1995

[54] ILLUMINATION MECHANISM FOR A VEHICLE ENTERTAINMENT DEVICE

[75] Inventors: Andrew D. Magic, Clarkston; James P. Muccioli; Andrew P. Person, both of Farmington Hills, all of Mich.

[73] Assignee: Chrysler Corporation, Highland Park, Mich.

[21] Appl. No.: 233,098

[22] Filed: Apr. 25, 1994

[51] Int. Cl.[6] .................................................. H04M 1/22
[52] U.S. Cl. .................. 362/26; 362/27; 362/86; 362/253
[58] Field of Search .................. 362/30, 26, 27, 362/32, 253, 86, 87; 116/279, 263, DIG. 5, DIG.28; 206/309, 216

[56] References Cited

U.S. PATENT DOCUMENTS

| | | |
|---|---|---|
| 3,647,986 | 3/1972 | Lace et al. ........................ 340/278 |
| 3,981,265 | 9/1976 | Gilbert . |
| 4,218,775 | 8/1980 | Cox et al. . |
| 4,322,780 | 3/1982 | Murakami et al. . |
| 4,625,263 | 11/1986 | Strohmeier . |
| 4,722,034 | 1/1988 | Ackeret . |
| 4,760,502 | 7/1988 | Ackeret . |
| 4,788,630 | 11/1988 | Gavagan . |
| 5,255,162 | 10/1993 | Kawamoto .......................... 362/26 |

*Primary Examiner*—Ira S. Lazarus
*Assistant Examiner*—Y. Quach
*Attorney, Agent, or Firm*—Christopher A. Taravella

[57] ABSTRACT

An illumination mechanism is provided for the receiving opening of an automobile entertainment device. The mechanism includes at least one light pipe fitted in the face of the entertainment device in close proximity to the area to be illuminated. This light pipe extends to a lamp or other light source otherwise used in the automobile for other illumination.

11 Claims, 1 Drawing Sheet

ILLUMINATION MECHANISM FOR A VEHICLE ENTERTAINMENT DEVICE

BACKGROUND OF THE INVENTION

This invention relates to an illumination mechanism for the slot opening for a vehicle entertainment device such as an automotive compact disk (CD) player. More particularly, this invention relates to the use of light pipes to direct light towards the slot opening of a CD player, without need for an additional light source.

Today, many cars have entertainment devices, such as CD players and cassette players, integrated into or installed below the dashboard. Such devices are difficult to operate at night unless they are illuminated. It is particularly difficult to insert a CD or cassette into the receiving opening of the player in the dark if the opening is not illuminated. Adding to the illumination problem is the fact that most receiving openings of the players have dust protectors in the form of door mechanisms. Others have slot-type receiving openings with felt dust protectors. These dust protectors prevent a light source within the opening from illuminating the opening as viewed from outside.

However, a light source located behind the opening is adequate to illuminate openings closed by protectors that allow light to penetrate, for example where a door mechanism is made of light penetrable material, or where the light can penetrate around the edges of the door. This solution is not adequate for slot type receiving openings because light cannot penetrate when the slot is closed.

U.S. Pat. No. 4,322,780 to Murakami et al. discloses an illumination mechanism for a car sound device. The Murakami mechanism includes a light introducing opening formed in a wall located in the cutout for a cassette receiving opening. Light shines through this opening and illuminates the dust cover.

U.S. Pat. No. 4,625,263 to Strohmeier discloses an illuminated control panel for a car radio. In particular, Strohmeier discloses the use of light guides which at their end faces provide operating indicia, e.g. eject, which extend laterally beyond operating elements, e.g. push buttons, in order to provide illumination of the controls. Illumination of slot openings or door openings, however, is not disclosed.

SUMMARY OF THE INVENTION

It is an object of the present invention to provide an illumination mechanism for the receiving opening of an automobile entertainment device.

It is a further object of the present invention to provide spot lighting for an automobile entertainment device without the need for additional illumination means.

In accordance with the present invention, there is provided an illumination mechanism for the receiving opening of a vehicle entertainment device, which is comprised of at least one light pipe fitted in the face of the entertainment device in close proximity to the area to be illuminated. This light pipe extends from another source of illumination, e.g. a lamp for backlighting the instrument panel. As a result the cost of illuminating an opening of a vehicle entertainment device is kept low and there is no additional power requirement.

BRIEF DESCRIPTION OF THE DRAWINGS

The foregoing and other features of the present invention will be more readily apparent from the following detailed description of preferred embodiments taken in conjunction with the attached drawings wherein: of an automotive compact disc player with an illumination mechanism for the FIG. 1 is a top left perspective view of the preferred embodiment slot opening.

DETAILED DESCRIPTION OF AN ILLUSTRATIVE EMBODIMENT

Figure 1:
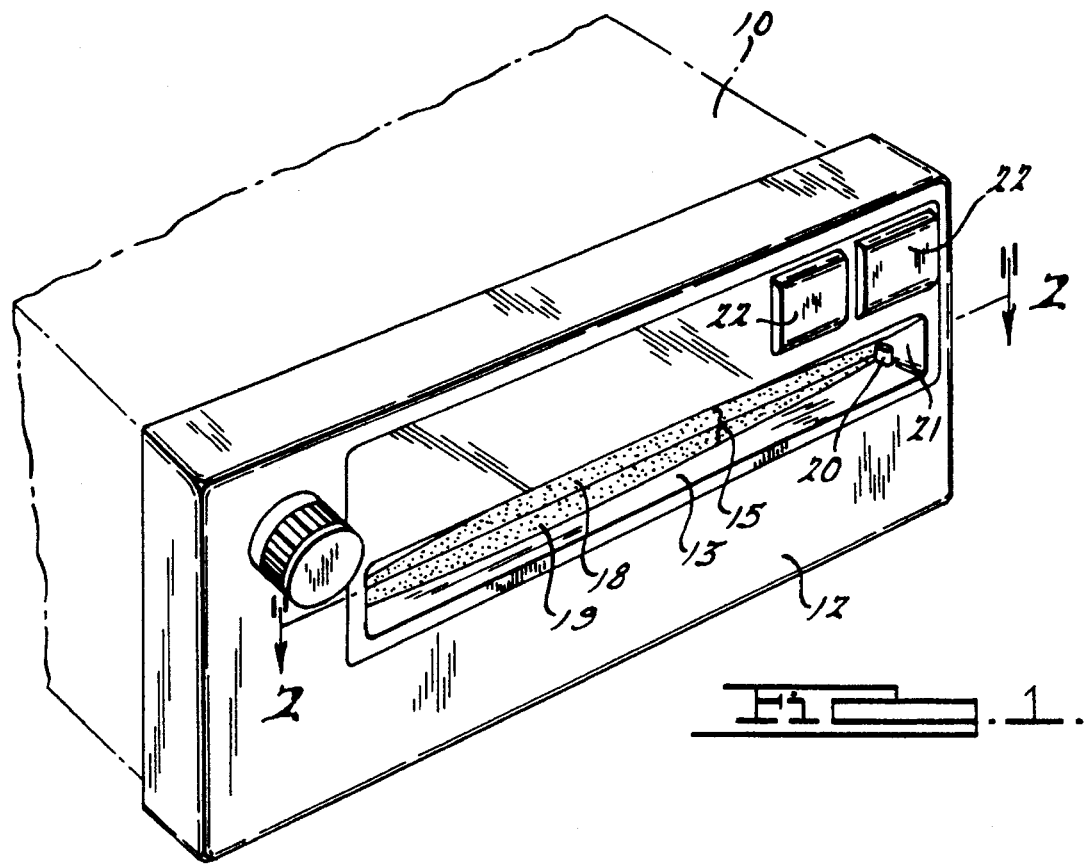

FIG. 1 illustrates a compact disc player 10 with the novel illumination mechanism. The compact disc player 10 has a face plate 12 that is generally opaque. In the face plate 12 there is a slot opening 15 for receiving compact discs 40 (shown in FIG. 2), and an opaque frame 13 surrounding the slot opening 15. The slot opening 15 has a dust protector comprised of a top flap 18 and a bottom flap 19, both flaps 18 and 19 preferably are made of a felt material. The flaps 18 and 19 allow a compact disc to be received therebetween without scratching either surface of the compact disc, but the flaps 18 and 19 are not generally light transmissible. The dust protecting means may also be comprised of an opaque door mechanism as disclosed in U.S. Pat. No. 4,322,780 to Murakami et al.

The present invention provides two light guide means 20 which may be, for example, light pipes. The light pipes 20 are positioned at both ends of the slot opening 15 and are recessed in the walls 21 of frame 13 and provide a means for guiding light emitted from a remote source located within the compact disc player 10 to the corners of the slot opening 15, thereby illuminating the corners of the slot opening 15. It is understood that the light pipes 20 may be located in any position adjacent to the slot opening 15 and recessed within frame 13 to provide illumination. Further, the externally visible faces of light pipes 20 may be provided with location indicia such as an arrow pointing to the slot opening 15 or words indicating the presence of the slot opening 15.

Figure 2:
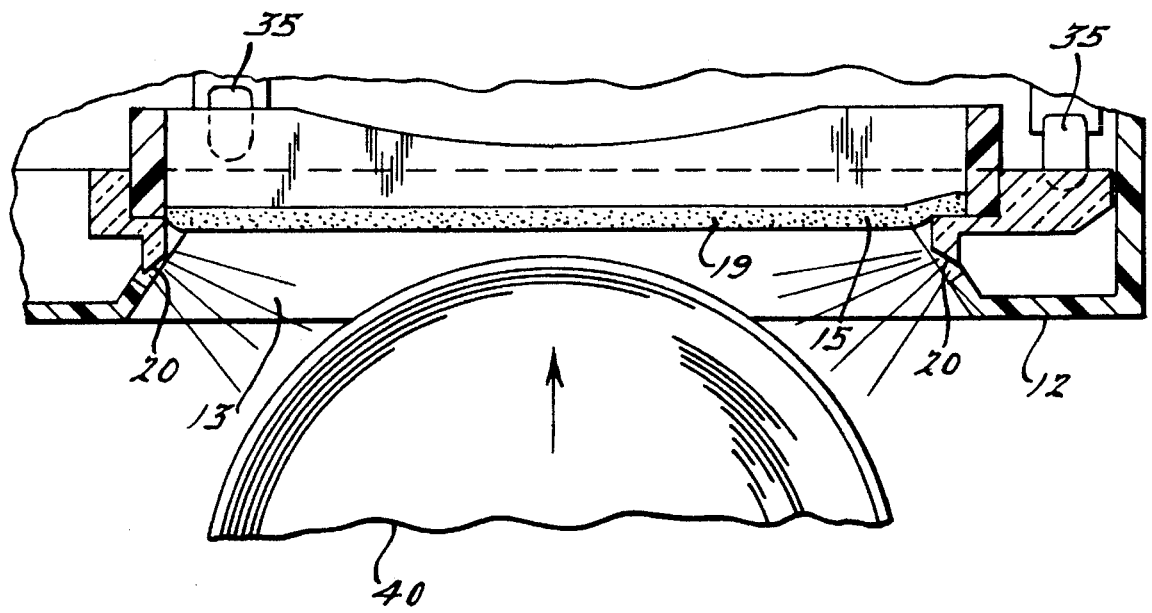
FIG. 2 is a sectional view of the preferred embodiment of the present invention taken along line 2—2 of FIG. 1 and showing a CD disc to be inserted in the slot opening.

FIG. 2 illustrates a plan view of a cross-section taken along 2—2 of FIG. 1. Light pipes 20 are preferably made of a clear or colored transparent hard plastic material while the face plate 12, frame 13, and flaps 18 and 19 are generally opaque. As shown in FIG. 2, the light pipes 20 extend from light sources 35, which are otherwise used to illuminate features such as the control buttons 22 positioned on face plate 12, to the corners of slot opening 15. Thus, light pipes 20 provide an illumination means allowing a user to more easily insert a compact disc 40 into the slot opening 15 in the dark.

It is understood that the novel illumination mechanism may also be used in any type of entertainment device requiring the insertion of an entertainment medium, such as a cassette deck, whether located in a vehicle or elsewhere.

While the invention has been particularly shown and described with reference to a preferred embodiment thereof, it will be understood by those skilled in the art that various changes in form and details may be made therein without departing from the spirit and scope of the invention.

What is claimed:

1. The combination comprising:
    an entertainment device having a face plate of generally light opaque material with exterior and interior surfaces, control buttons extending through said face plate, a receiving slot having two ends in said face plate for receiving separate entertainment media, and a plurality of light sources within said entertainment device and remote from said receiving slot and said face plate interior surface, at least one of said light sources positioned to illuminate said control buttons; and an illumination mechanism including light guide means having a pair of first end parts, each with an externally visible portion at a respective end of said receiving slot and a second end adjacent to said remote light source, said light guide means guiding the light emitted from said remote light source to the externally visible portion of each said first part located at each end of said receiving slot, said externally visible portions visually defining the ends of said receiving slot into which the entertainment media is to be inserted and directing light toward said receiving slot.

2. The combination of claim 1 wherein said entertainment device is located in a vehicle and said light guide means comprises a pair of light pipes, each of said light pipes having a respective said first end and a second end.

3. The combination of claim 2 wherein each said light pipe is made of a clear transparent material.

4. The combination of claim 2 wherein each said light pipe is made of a colored transparent material.

5. The combination of claim 2 wherein each said light pipe is made of a hard plastic material.

6. The combination of claim 1 further including location indicia on the externally visible portion of each said first end part.

7. The combination of claim 1 further comprising at least one flap on said front panel overlying said slot.

8. The combination of claim 7 wherein said at least one flap is located in the slot between said externally visible portions.

9. The combination of claim 1 wherein each said externally visible portion has a face angled toward the slot to direct the light toward the slot and facilitate entry of the entertainment medium into the slot.

10. The combination of claim 1 wherein each said externally visible portion has a different appearance from the exterior surface of said face plate.

11. An automotive entertainment device comprising:

a housing;

a plurality of light sources within said housing;

a front panel attached to said housing and having control buttons extending therethrough, said front panel defining a slot opening configured to receive entertainment media, at least one of a said light sources being positioned within said housing to illuminate said control buttons and being remote from said slot opening; and a pair of light pipes within said housing, each light pipe having one end receiving light from said light source and a light emitting end recessed within said front panel at a respective end of said slot opening, each said light pipe guiding light emitted from said remote light source to its respective light emitting end to direct light toward at least a part of said slot opening and said light emitting ends indicating the slot opening therebetween to facilitate the insertion of the entertainment media.

* * * * *